(12) United States Patent
Karaoguz et al.

(10) Patent No.: US 9,369,940 B2
(45) Date of Patent: *Jun. 14, 2016

(54) MOBILE HANDHELD MULTI-MEDIA GATEWAY AND PHONE

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,657

(22) Filed: Jan. 21, 2015

(65) Prior Publication Data

US 2015/0131644 A1    May 14, 2015

Related U.S. Application Data

(63) Continuation of application No. 11/218,274, filed on Sep. 1, 2005, now Pat. No. 8,964,765.

(60) Provisional application No. 60/627,574, filed on Nov. 12, 2004.

(51) Int. Cl.
*H04W 4/00*    (2009.01)
*H04W 40/02*   (2009.01)
(Continued)

(52) U.S. Cl.
CPC .............. *H04W 40/02* (2013.01); *H04L 12/46* (2013.01); *H04L 12/66* (2013.01); *H04L 45/74* (2013.01);
(Continued)

(58) Field of Classification Search
CPC ...... H04W 40/02; H04W 80/04; H04W 88/06; H04L 12/46; H04L 12/66; H04L 45/74; H04M 1/2535
See application file for complete search history.

(56) References Cited

U.S. PATENT DOCUMENTS 5,978,386 A   11/1999  Hamalainen et al.
6,452,913 B1   9/2002  Protor, Jr.
(Continued)

FOREIGN PATENT DOCUMENTS

CN    1307436        8/2001
EP    1324550 A      7/2003

OTHER PUBLICATIONS

European Search Report for European patent application No. 05 019 988.4 issued Nov. 24, 2011, 5 pages.
(Continued)

*Primary Examiner* — Lonnie Sweet
(74) *Attorney, Agent, or Firm* — Brinks Gilson & Lione (57) ABSTRACT

A system and method for providing a mobile handheld multimedia gateway and phone. Various aspects of the present invention may comprise a first communication interface module that is adapted to communicatively couple the mobile telephone to a mobile telephone communication network. A second communication interface module may be adapted to communicatively couple the mobile telephone to a computer communication network. At least one module may utilize the second communication interface module to communicate with the computer communication network to establish an independent network presence for the mobile telephone on the computer communication network. The mobile telephone may, for example, be established as an autonomous addressable device on the computer communication network.

16 Claims, 5 Drawing Sheets

(51) Int. Cl.

| | | |
|---|---|---|
| *H04L 12/46* | (2006.01) | |
| *H04L 12/66* | (2006.01) | |
| *H04M 1/253* | (2006.01) | |
| *H04W 88/06* | (2009.01) | |
| *H04L 12/741* | (2013.01) | |
| *H04W 80/04* | (2009.01) | |
| *H04M 1/725* | (2006.01) | |
| *H04W 88/16* | (2009.01) | |

(52) U.S. Cl.
CPC ............ *H04M 1/2535* (2013.01); *H04W 80/04* (2013.01); *H04W 88/06* (2013.01); *H04M 1/72522* (2013.01); *H04W 88/16* (2013.01)

(56) References Cited

U.S. PATENT DOCUMENTS

| | | |
|---|---|---|
| 6,600,902 B1 | 7/2003 | Bell |
| 7,376,091 B1 | 5/2008 | Eccles et al. |
| 7,460,525 B2 | 12/2008 | Moore, Jr. |
| 7,496,360 B2 | 2/2009 | Sindhwani et al. |
| 8,964,765 B2 * | 2/2015 | Karaoguz ............ H04M 1/2535 370/338 |
| 2001/0039497 A1 | 11/2001 | Hubbard |
| 2002/0083198 A1 | 6/2002 | Kim et al. |
| 2003/0005060 A1 | 1/2003 | Davidson et al. |
| 2003/0086402 A1 | 5/2003 | Yang |
| 2003/0134629 A1 | 7/2003 | Ollis et al. |
| 2003/0174685 A1 | 9/2003 | Hasebe |
| 2003/0227939 A1 * | 12/2003 | Yukie ...................... H04L 12/64 370/465 |
| 2003/0233576 A1 * | 12/2003 | Maufer .................. H04L 29/06 709/226 |
| 2003/0236872 A1 | 12/2003 | Atkinson |
| 2004/0018854 A1 | 1/2004 | Gorsuch |
| 2004/0028009 A1 | 2/2004 | Dorenbosch et al. |
| 2004/0160932 A1 | 8/2004 | Yegoshin |
| 2004/0214527 A1 | 10/2004 | Lim et al. |
| 2004/0228336 A1 | 11/2004 | Kung et al. |
| 2005/0022178 A1 | 1/2005 | Ghafoor et al. |
| 2005/0030928 A1 | 2/2005 | Virtanen et al. |
| 2005/0080891 A1 | 4/2005 | Cauthron |
| 2005/0099943 A1 | 5/2005 | Naghian et al. |
| 2005/0118951 A1 | 6/2005 | Poursabahian et al. |
| 2005/0129029 A1 | 6/2005 | Creamer |
| 2005/0198218 A1 | 9/2005 | Tasker et al. |
| 2005/0239496 A1 * | 10/2005 | Sylvain ................ H04W 88/06 455/552.1 |
| 2006/0291455 A1 | 12/2006 | Katz et al. |

OTHER PUBLICATIONS

H. Holtkamp, Einführung in Bluetooth, retrieved from the Internet at http://www.rvs.uni-bielefeld.de/~heiko/bluetooth/bluetooth.pdf, XP55012399, Nov. 5, 2003, 29 pages.

Ex parte Howard Eugene Massey, US Patent and Trademark Board of Appeals and Interferences, Appeal No. 2004-0298, U.S. Appl. No. 09/385,226, opinion heard May 6, 2002, 9 pages.

* cited by examiner

MOBILE HANDHELD MULTI-MEDIA GATEWAY AND PHONE

PRIORITY CLAIM

This patent application is related to and claims priority from U.S. patent application Ser. No. 11/218,274, filed Sep. 1, 2005 and entitled MOBILE HANDHELD MULTI-MEDIA GATEWAY AND PHONE, pending, which claims the priority of provisional patent application Ser. No. 60/627, 574, filed Nov. 12, 2004, and titled "MOBILE HANDHELD MULTI-MEDIA GATEWAY AND PHONE," the contents of which applications are hereby incorporated herein by reference in their entirety.

BACKGROUND

Mobile phones may currently be coupled to a computer. For example, a mobile (e.g., cellular or satellite) phone and a personal computer may comprise respective USB ports, serial ports or other compatible data interfaces that provide for data communication between the personal computer and the mobile phone. A mobile phone may be coupled to a networked computer, for example and without limitation, to effect communications that may not be possible or practical over the communication network with which the mobile phone may typically interface. For example, a mobile phone may be coupled to a personal computer to download software or ring tones into the mobile phone, where the personal computer may, in turn, be coupled to the Internet.

Using the personal computer as an intermediary, a user may, for example, download software or other information into a mobile phone that is communicatively coupled to the personal computer. For example in an exemplary scenario, a cellular phone may be communicatively coupled to a personal computer and treated as a memory device (or other accessory) of the personal computer. Utilizing a personal computer or other networked device in such a manner may be inconvenient and at times, impossible.

Further limitations and disadvantages of conventional and traditional approaches will become apparent to one of skill in the art, through comparison of such systems with the present invention as set forth in the remainder of the present application with reference to the drawings.

BRIEF SUMMARY

Various aspects of the present invention provide a system and method for providing a mobile handheld multi-media gateway and phone, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Figure 1:
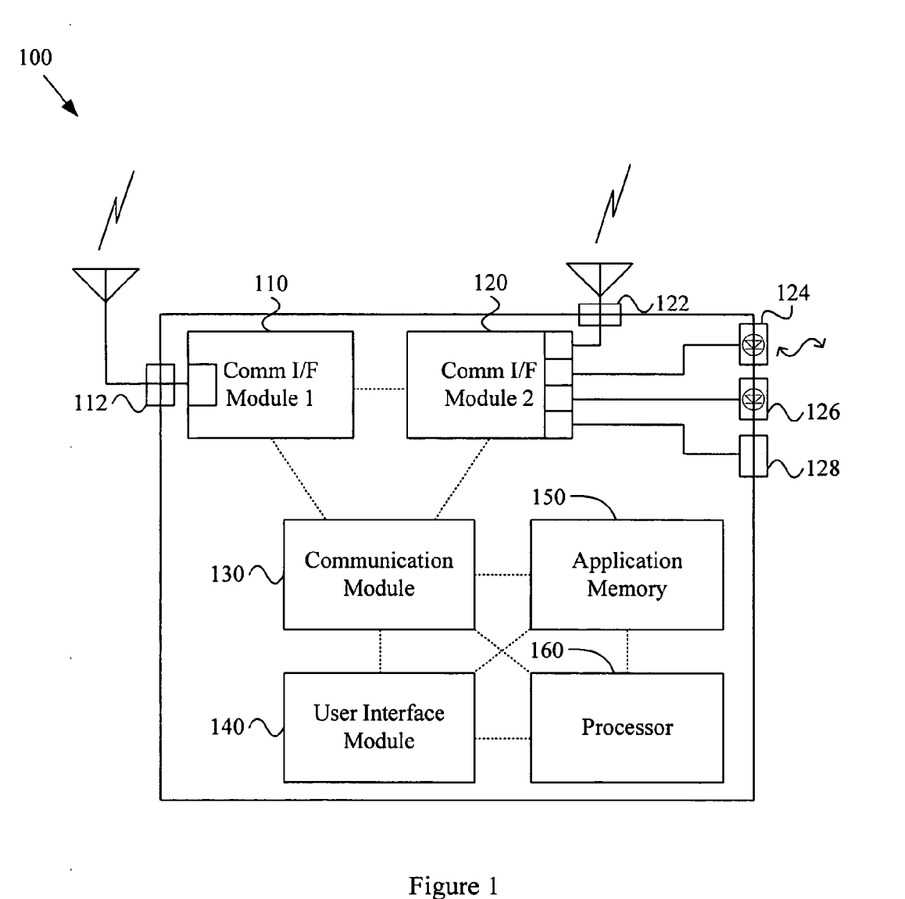
FIG. 1 is a block diagram illustrating an exemplary mobile handheld multi-media gateway and phone, in accordance with various aspects of the present invention.

FIG. 1 is a block diagram illustrating an exemplary mobile handheld multi-media gateway and phone 100, in accordance with various aspects of the present invention. The mobile handheld multi-media gateway and phone 100 (which, for convenience, may also be referred to herein in a non-limiting manner as the "mobile telephone 100") may comprise a first communication interface module 110 adapted to communicatively couple the mobile telephone 100 to a mobile telephone communication network. A mobile telephone communication network 100 may, for example and without limitation, comprise characteristics of a cellular telephone network, a satellite telephone communication network, a mobile telephone base station that is communicatively coupled to the Public Switched Telephone Network ("PSTN"), a mobile telephone base station that is communicatively coupled to a cable television network, etc. The scope of various aspects of the present invention should not be limited by characteristics of a particular type of mobile telephone communication network.

The first communication interface module 110 may comprise characteristics of any of a variety of types of communication interface modules. For example and without limitation, the first communication interface module 110 may be adapted (i.e., comprise hardware and/or software components) to communicatively couple the mobile telephone 100 to one or more cellular communication networks. Such cellular communication network(s) may be based on any of a number of cellular communication architectures and protocols (e.g., GSM, CDMA, WCDMA, TDMA, PDC, analog, etc.).

Also for example, the first communication interface module 110 may be adapted to communicatively couple the mobile telephone 100 to a base station, which in turn is communicatively coupled to the PSTN or a cable television network. Additionally for example, the first communication interface module 110 may be adapted to communicatively couple the mobile telephone 100 to a satellite telephone communication network. In general, the first communication interface module 110 may be adapted to communicatively couple the mobile telephone 100 to any one or more of a variety of telephone communication networks. Accordingly, the scope of various aspects of the present invention should not be limited by characteristics of a particular type of telephone communication network or by characteristics of a particular hardware and/or software module that is adapted to communicate with such a network.

The exemplary mobile telephone 100 may comprise a second communication interface module 120 that is adapted to communicatively couple the mobile telephone 100 to one or more computer communication networks. Such a computer communication network may comprise characteristics of any of a variety of computer communication networks. For example and without limitation, the computer communication network may comprise the Internet. Also for example, the computer communication network may comprise a metropolitan area network ("MAN"), a wide area network ("WAN"), a local area network ("LAN") and/or a personal area network ("PAN").

The computer communication network may, for example, comprise a plurality of communicatively coupled computer communication networks and/or other communication networks. For example, the computer communication network may comprise a LAN that is communicatively coupled to the Internet directly through an Internet node or through a broadband communication network. Also for example, the computer communication network may comprise a PAN that is communicatively coupled to the Internet through a cellular telephone network, the PSTN or a broadband communication network. Further for example, the computer communication network may comprise a PAN that is communicatively coupled to a campus LAN, which in turn is communicatively coupled to the Internet. Various non-limiting exemplary general communication, telecommunication and computer communication networks will also be illustrated in FIG. 3, which will be discussed later. The scope of various aspects of the present invention should not be limited by characteristics of a particular computer communication network or characteristics of a particular combination of computer and/or other communication networks.

The second communication interface module 120 may comprise characteristics of any of a variety of types of communication interface modules. For example and without limitation, the second communication interface module 120 may be adapted (i.e., comprise hardware and/or software components) to communicatively couple the mobile telephone 100 to one or more computer communication networks.

The second communication interface module 120 may be adapted to communicate with the computer communication network utilizing any of a variety of communication protocols. Such communication protocols may, for example, comprise computer communication protocols and/or telecommunication or general communication protocols. The second communication interface module 120 may, for example, comprise characteristics of an IEEE 802.11-based (and/or IEEE 802.15-based) communication port. The second communication interface module 120 may, for example, comprise characteristics of an Ethernet or Token-ring based communication port. Also for example, the second communication interface module 120 may comprise characteristics of an UltraWideBand ("UWB"), Bluetooth, ZigBee, high data rate WPAN and/or low data rate WPAN communication port. Accordingly, the scope of various aspects of the present invention should not be limited by characteristics of a particular communication protocol or characteristics of a particular communication module or port for communicating utilizing any particular communication protocol.

The second communication interface module 120 may be adapted to communicate with the computer communication network over a variety of communication media. For example and without limitation, the second communication interface module 120 may comprise a wireless RF communication port 122 for communicating with one or more computer communication networks. Also for example, the second communication interface module 120 may comprise a non-tethered optical communication port 124 (e.g., adapted to communicate over infrared or ultraviolet optical frequencies). Further for example, the second communication interface module 120 may comprise a wired communication port 128 or a tethered optical communication port 126, through which the mobile telephone 100 may be physically coupled (e.g., through an electrically or optically conductive transmission line) to a device of the computer communication network. The scope of various aspects of the present invention should not be limited by characteristics of a particular communication medium or by characteristics of an interface module or port for communicating over a particular communication medium.

In various non-limiting exemplary scenarios, the second communication interface module 120 may utilize the first communication interface module 110 to indirectly communicatively couple the mobile telephone 100 to a computer communication network. For example and without limitation, such a configuration may be utilized to communicatively couple the mobile telephone 100 to the computer communication network through a cellular telephone network or the PSTN.

Communication between the second communication interface module 120 and the computer communication network may be initiated in any of a variety of manners. For example and without limitation, such communication may be initiated in response to direct user command in response to a timer, or in response to a signal received from another communication device. The second communication interface module 120 may, for example, be adapted to detect the presence of the computer communication network prior to establishing a communication link between the mobile telephone 100 and the computer communication network (e.g., through the communication (i.e., transmission and/or reception) of beacon messages and responses to beacon messages. For example, the second communication interface module 120 may be adapted to transmit beacon messages prior to establishing a communication link between the mobile telephone 100 and the computer communication network, and monitoring responses to such beacon messages. Also for example, the second communication interface module 120 may be adapted to detect the presence of the computer communication network through monitoring general communication traffic related to the computer communication network. The scope of various aspects of the present invention should not be limited by characteristics of the establishment of any particular type of communication link between a communication interface module and one or more computer communication networks.

The second communication interface module 120 may, for example, be adapted to communicatively couple the mobile telephone 100 to the computer communication network through one or more of a plurality of communication pathways. The non-limiting example provided in FIG. 1 shows the second communication interface module 120 adapted to communicate over wireless RF, non-tethered optical, tethered optical and wired interfaces. The second communication interface module 120 may further, for example, be adapted to communicate over a plurality of communication pathways simultaneously. Such plurality of communication pathways (e.g., between the mobile telephone 100 and a networked device communicating with the mobile telephone 100) may be completely independent or may share various communication network portions. Accordingly, the scope of various aspects of the present invention should not be limited by characteristics of a particular communication pathway or by characteristics of communication over a plurality of communication pathways serially or concurrently.

The exemplary mobile telephone 100 may comprise a communication module 130 that generally manages communication operation for the mobile telephone 100. The communication module 130 may, for example, utilize the first communication interface module 110 to establish and perform communication with a mobile telephone communication network (e.g., utilizing the capabilities of the first communication interface module 110, some of which were discussed previously). The communication module 130 may also, for example, utilize the second communication interface module 120 to establish and perform communication with a computer communication network (e.g., utilizing the capabilities of the second communication interface module 120, some of which were discussed previously).

The communication module 130 may (e.g., utilizing the second communication interface module 120) communicate with a computer communication network to establish the mobile telephone 100 as an autonomous addressable device on the computer communication network. As an autonomous addressable device on the computer communication network, the mobile telephone 100 may have an independent network presence. Being so networked, the mobile telephone 100 may, for example, communicate with other devices coupled to the computer communication network as an independent networked entity, rather than as a peripheral or attachment of another networked computing device.

For example, the mobile telephone 100 may receive information addressed to a unique computer network address assigned to the mobile telephone (e.g., even in a scenario where the mobile telephone is coupled to the computer communication network through a personal computer with its own unique network address). Also for example, the mobile telephone 100 may communicate directly with a mobile telephone company through the computer communication network to receive software upgrades or to download multimedia information (e.g., music and/or video information). Further for example, the mobile telephone 100 may function as a computer communication network gateway or router. For example, the mobile telephone 100 may direct information (e.g., addressed to the mobile telephone 100) to peripheral or attachment devices of the mobile telephone 100, or may route information directed to another networked device to that device.

The communication module 130 may establish the mobile telephone 100 as an autonomous addressable device (e.g., a device having an independent network presence) in any of a variety of manners. For example and without limitation, the communication module 130 may establish a unique computer network address for the mobile telephone. In a non-limiting exemplary Internet scenario, the communication module 130 may establish a unique IP address for the mobile telephone 100. The communication module 130 may, for example, retrieve such an IP address from an IP address server of the computer communication network. Alternatively for example, the communication module 130 may determine and communicate an IP address that has been predetermined for the mobile telephone 100 (e.g., similar to the manner in which a unique telephone number is assigned to a mobile telephone). Further for example, the communication module 130 may determine an IP address for the mobile telephone 100 that is based, at least in part, on the static telephone number or serial number that is assigned to the mobile telephone 100.

In another non-limiting exemplary scenario, the communication module 130 may establish the mobile telephone 100 as an autonomous addressable device by interfacing with a network controller of a MAN, WAN, LAN or PAN to establish an independent network presence (e.g., including a unique computer network address) for the mobile telephone 100. As with the exemplary Internet scenario discussed previously, such a unique computer network address may be predetermined, randomly or pseudo-randomly assigned in real-time and/or at least partially derived. For example, such a unique computer network address of the mobile telephone 100 may comprise any of a variety of characteristics. For example and without limitation, the unique computer network address may comprise aspects of the static telephone number of the mobile telephone 100 (e.g., in combination with various computer network designations, like sector, cell, node, access point or computer identifiers). Accordingly, the scope of various aspects of the present invention should not be limited by characteristics of a particular type of computer network address for the mobile telephone 100.

The communication module 130 (e.g., operating in conjunction with the computer communication network) may establish the mobile telephone 100 as an autonomous addressable networked device by providing that the presence of the mobile telephone 100 on the computer communication network is detectable by at least a portion of other devices coupled to the computer communication network. For example and without limitation, other devices that are also communicatively coupled to the computer communication network may be able to scan the computer communication network or communicate with a network database to determine that the mobile telephone 100 is present on the computer communication network. In a non-limiting exemplary scenario, a first autonomously addressable mobile telephone may be able to determine if a second mobile telephone is communicatively coupled to the computer communication network (e.g., directly or through one or more intervening computer and/or communication networks). As a non-limiting example, a networked device desiring to communicate with the mobile telephone 100 may determine whether the mobile telephone 100 is presently a part of the computer communication network.

Similarly, the communication module 130 may be adapted to detect other devices coupled to the computer communication network. For example, in a non-limiting exemplary scenario, the communication module 130 may be able to determine if another mobile telephone is communicatively coupled to the computer communication network (e.g., directly or through one or more intervening computer and/or communication networks). The communication module 130 may, for example, make such a determination by attempting to communicate with a particular mobile telephone or may communicate with a networked database comprising information of networked devices. Such a database may, for example, comprise characteristics of a database listing mobile telephones that are presently communicatively coupled to the computer communication network. Such a database may also, for example, comprise characteristics of a centralized database or a distributed database.

The communication module 130 may, for example after establishing the mobile telephone 100 as an autonomous addressable device on the computer communication network, manage communication of information between the mobile telephone 100 and other networked devices over the computer communication network (e.g., utilizing the unique network address of the mobile telephone 100). Such other networked devices may comprise characteristics of any of a variety of devices that may be communicatively coupled to a computer communication network (e.g., a multi-media server, a program server, another mobile telephone, a personal computer, a portable telephone phone coupled to the computer communication network through the PSTN, a web server, etc.).

The communication module 130, or other module of the mobile telephone 100, may, for example, comprise the capability to receive and/or transmit unsolicited messages and present such messages to a user of the mobile telephone 100.

As a non-limiting example, the communication module 130 may be adapted to provide messenger capability.

The communication module 130 may, or other module of the mobile telephone 100 may, for example, may, for example, be adapted to share stored information and/or processing power with other networked devices. For example and without limitation, the communication module 130 may be adapted to communicate (e.g., transmit and/or receive) file structure information with another networked device. Such file directory information (e.g., file structure information) may, for example, be utilized by the mobile telephone 100 to access stored information or storage space in another networked device or vice versa. Also for example, the communication module 130 may be adapted to communicate file format information with another networked device. Such file format information may, for example, be utilized by the mobile telephone 100 (or other networked device) to access file information or convert file information to a particular format.

Additionally, for example, the communication module 130 may be adapted to communicate processor-sharing information with another networked device. Such processor sharing information may, for example, be utilized by the mobile telephone 100 (or other networked device) to share processing power with another networked device. For example, such processor sharing information may comprise a request or command for another processor to perform an operation (e.g., file formatting, encoding/decoding, general data processing, etc.).

In general, the communication module 130 may generally manage communication operation of the mobile telephone 100. Accordingly, the scope of various aspects of the present invention should not be limited by characteristics of a particular manner in which such operation may be controlled.

The mobile telephone 100 may comprise a user interface module 140 that provides an interface between the mobile telephone 100 and a user of the mobile telephone 100. The user interface module 140 may comprise characteristics of any of a variety of user interfaces. The user interface module 140 may, for example and without limitation, be adapted to provide any of a variety of audio, video and/or tactile user interfaces. For example and without limitation, the user interface module 140 may be adapted to provide video display, audio speaker, video camera, microphone, touchscreen, touchpad, keypad and vibration U/I functionality.

For example, the mobile telephone 100 (e.g., the communication module 130) may utilize the user interface module 140 to provide a communication interface (e.g., video, audio and/or textual) between a user of the mobile telephone 100 and other devices coupled to the computer communication network. For example, the mobile telephone 100 may utilize the user interface module 140 to notify a user of an incoming message to the mobile telephone 100 from another communication device (e.g., another mobile telephone). Also for example, the mobile telephone 100 may utilize the user interface module 140 to provide a user interface for information communicated over the computer communication network, where the user interface shares various characteristics with a typical mobile telephone user interface. For example, the mobile telephone 100 may utilize the user interface module 140, for communications between the mobile telephone 100 and another mobile telephone over a computer communication network, to provide a user interface that is generally the same as the user interface for a mobile telephone communication over a mobile telephone communication network. The scope of various aspects of the present invention should not be limited by characteristics of a particular type of user interface or hardware and/of software that provide a particular type of user interface.

The exemplary mobile telephone 100 may comprise an application memory 150 (e.g., in addition to other memory) for storing software application instructions. The mobile telephone 100 may also comprise a processor 160 for executing software application instructions. The exemplary mobile telephone 100 may thus comprise an application layer on which any of a variety of application software (e.g., communication software and/or user interface software) may execute. For example and without limitation, such software may comprise communication software, web browser software, multi-media presentation software, various audio and/or video software, text messaging software, file translation software, software to manage file sharing, software to manage processor sharing, gaming software, etc. Also for example, such software may comprise software supportive of any of a variety of messenger-type applications (e.g., instant messaging). Accordingly, the scope of various aspects of the present invention should not be limited by characteristics of a particular software application that may be executed by a processor.

Note that the previous discussion generally referred to modules of the exemplary module telephone 100. Such modules were chosen for illustrative clarity and should not limit various aspects of the present invention. For example, a module may be implemented in hardware, software or a combination thereof. Also, modules may share various hardware and/or software components. For example and without limitation, the communication module 130 may be implemented, at least in part, by the processor 160 executing software instructions stored in the application memory 150. Accordingly, the scope of various aspects of the present invention should not be limited by arbitrary hardware or software boundaries between modules.

Also, various components of the exemplary mobile telephone 100 may be implemented in varying degrees of integration. For example, various modules (e.g., the first communication module 110, second communication module 120 and communication module 130) may be implemented in a single integrated circuit or may be implemented in a plurality of integrated circuits of a circuit board. Accordingly, the scope of various aspects of the present invention should not be limited by any particular degree of integration.

The exemplary mobile telephone 100 illustrated in FIG. 1 was presented to illustrate a portion of generally broader aspects of the present invention. Accordingly, the scope of various aspects of the present invention should not be limited by characteristics of the exemplary illustration.

Figure 2:
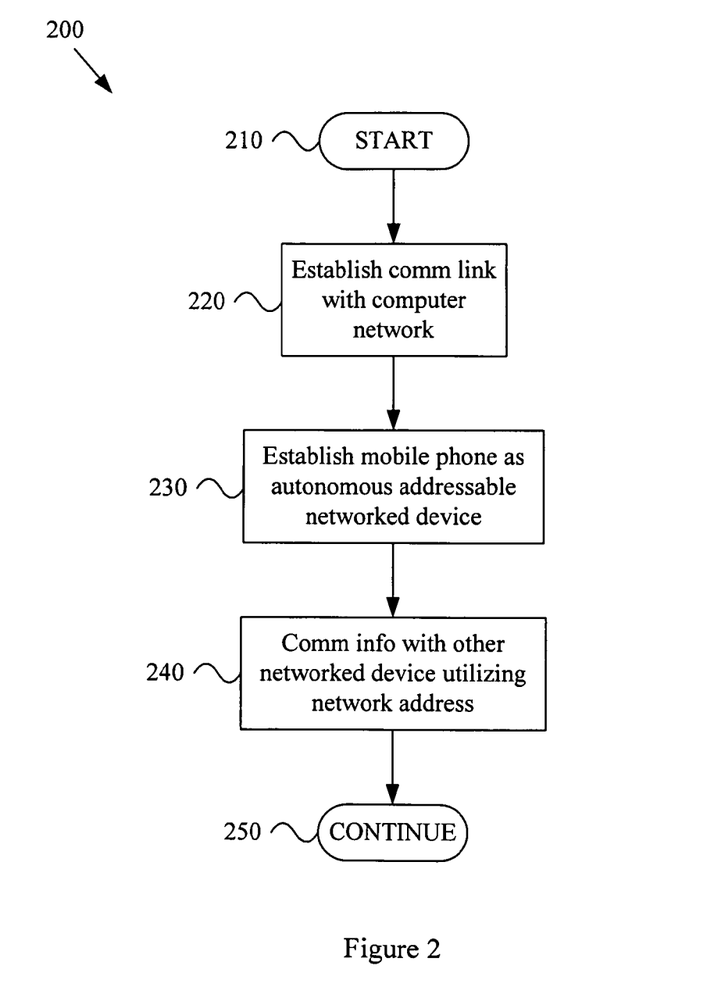
FIG. 2 is a flow diagram illustrating an exemplary method for providing mobile handheld multi-media gateway and phone communications, in accordance with various aspects of the present invention.

FIG. 2 is a flow diagram illustrating an exemplary method 200 for providing mobile handheld multi-media gateway and phone communications, in accordance with various aspects of the present invention. The exemplary method 200 may, for example and without limitation, share various functional characteristics with the exemplary mobile telephone 100 illustrated in FIG. 1 and discussed previously. The exemplary method 200 may, for example, be implemented in a mobile handheld communication device (e.g., a mobile phone).

The exemplary method 200 may begin executing at step 210. The method 200 may begin executing for any of a variety of reasons. For example and without limitation, the method 200 may begin executing in response to an explicit user command to begin. Also for example, the method 200 may begin executing in response to a signal received at a mobile telephone from another communication device. Further for example, the method 200 may begin executing in response to a mobile telephone reset or power-up condition. Accordingly, the scope of various aspects of the present invention should not be limited by characteristics of any particular initiating cause or condition.

The exemplary method 200 may, at step 220, comprise establishing a communication link with a computer communication network. Step 220 may, for example and without limitation, share various characteristics with the functionality discussed previously with regard to the second communication interface module 120 of the exemplary mobile telephone 100 illustrated in FIG. 1 and discussed previously.

As discussed previously with regard to the exemplary mobile telephone 100, such a computer communication network may comprise characteristics of any of a variety of computer communication networks (e.g., the Internet, a MAN, WAN, LAN, PAN, etc.). Similarly, the computer communication network may, for example, comprise a plurality of communicatively coupled computer communication networks and/or other communication networks in any of a large number of configurations. The scope of various aspects of the present invention should not be limited by characteristics of a particular computer communication network or characteristics of a particular combination of computer and/or other communication networks.

Step 220 may, for example, comprise utilizing any of a variety of communication protocols to communicate with the computer communication network. As discussed previously with regard to the second communication module 120 of FIG. 1, such communication protocols may, for example, comprise computer communication protocols, telecommunication protocols and/or general communication protocols. Such communication protocols may, for example and without limitation comprise communication protocols based on the IEEE 802.11 and/or IEEE 802.15 standards. Such communication protocols may, for example, comprise characteristics of Ethernet and/or Token Ring standards (e.g., IEEE 802.3 and/or IEEE 802.5). Also for example, such communication protocols may comprise characteristics of UWB, Bluetooth, Zig-Bee, high data rate WPAN and/or low data rate WPAN protocols, etc. Accordingly, the scope of various aspects of the present invention should not be limited by characteristics of a particular communication protocol or manner of communicating utilizing any particular communication protocol.

Step 220 may, for example, comprise utilizing any of a variety of communication media in communicating with the computer communication network. As discussed previously with respect to the second communication module 120 of FIG. 1, such communication media may comprise wireless RF media, non-tethered optical media, wired media, tethered optical media, etc. The scope of various aspects of the present invention should not be limited by characteristics of a particular communication medium or by characteristics of an interface module or port for communicating over a particular communication medium.

Step 220 may, for example, comprise communicating with the computer communication network directly or through one or more intermediate communication networks (e.g., a cellular telephone network). In a non-limiting exemplary scenario, step 220 may comprise communicating with the computer communication network through a telephone communication network that is communicatively coupled to the computer communication network. In another non-limiting exemplary scenario, step 220 may comprise communicating with the computer communication network through a PAN, a broadband communication network and the Internet.

Step 220 may, for example, comprise communicating with the computer communication network through one or more of a plurality of communication pathways (e.g., either serially or concurrently). For example, step 220 may comprise communicating with the computer communication network over wireless RF, non-tethered optical, tethered optical or wired interfaces. Such plurality of communication pathways may be completely independent or may share various communication network portions. Accordingly, the scope of various aspects of the present invention should not be limited by characteristics of a particular communication pathway or by characteristics of communication over a plurality of communication pathways serially or concurrently.

Step 220 may comprise initiating communication with the computer communication network in any of a variety of manners. For example and without limitation, step 220 may comprise initiating such communication in response to direct user command, in response to a timer, in response to a signal received from another communication device, etc. Step 220 may also, for example, comprise detecting the presence of the computer communication network prior to establishing a communication link with the computer communication network (e.g., by detecting beacon messages, responses to beacon messages and/or other communication traffic). Further for example, step 220 may comprise broadcasting beacon messages prior to establishing a communication link with the computer communication network, and monitoring responses to such beacon messages. The scope of various aspects of the present invention should not be limited by characteristics of any particular manner of establishing a communication link with one or more computer communication networks.

In general, step 220 may comprise establishing a communication link with a computer communication network. Accordingly, the scope of various aspects of the present invention should not be limited by characteristics of any particular manner of establishing a communication link with a computer communication network.

The exemplary method 200 may, at step 230, comprise communicating with the computer communication network to establish the mobile telephone (or mobile handheld multimedia gateway and phone) on the computer communication network as an autonomous addressable device (e.g., comprising a unique network address). Step 230 may, for example and without limitation, share various functional characteristics with the communication module 130 and the second communication interface module 120 of the exemplary mobile telephone 100 illustrated in FIG. 1 and discussed previously.

The mobile telephone, as an autonomous addressable device on the computer communication network, may have an independent network presence. As explained previously, being so networked, the mobile telephone may, for example, communicate with other devices coupled to the computer communication network as an independent networked entity, rather than as a peripheral or attachment of another (e.g., a host) networked computing device.

For example, the mobile telephone may receive information addressed to the unique network address assigned to the mobile telephone. The mobile telephone may, for example, communicate directly with a mobile telephone company through the computer communication network to receive software upgrades or with a media information server to download multi-media information. Further for example, the mobile telephone, as an autonomous addressable device may function as a computer communication network gateway or router. For example, the mobile telephone may direct information (e.g., addressed to the mobile telephone) to peripheral or attachment devices of the mobile telephone, or may route information directed to another networked device to that device.

Step 230 may comprise establishing the mobile telephone as an autonomous addressable device on the computer communication network in any of a variety of manners. For example and without limitation, the step 230 may comprise establishing a unique computer network address for the mobile telephone. Such a network address may, for example, be static (e.g., constant with regard to the mobile telephone) or dynamic (e.g., assigned to the mobile telephone on an as-needed basis).

In a non-limiting exemplary Internet scenario, step 230 may comprise establishing a unique IP address for the mobile telephone. For example, step 230 may comprise retrieving such an IP address from an IP address server of the computer communication network. Also for example, step 230 may comprise determining and communicating an IP address that has been predetermined for the mobile telephone. Further for example, step 230 may comprise determining an IP address for the mobile telephone that is based, at least in part, on the static telephone number or serial number that has been assigned to the mobile telephone.

In another non-limiting exemplary scenario, step 230 may comprise establishing the mobile telephone as an autonomous addressable device by interfacing with a network controller of a MAN, WAN, LAN or PAN to establish an independent network presence (e.g., including a unique computer network address) for the mobile telephone. As with the exemplary Internet scenario discussed previously, such a unique computer network address may be predetermined, randomly or pseudo-randomly determined in real-time, and/or at least partially derived. For example, such a unique computer network address of the mobile telephone may comprise any of a variety of characteristics. For example and without limitation, the unique computer network address may comprise aspects of the static telephone number of the mobile telephone (e.g., in combination with various computer network designations, like sector, cell, node, access point or computer identifiers). Accordingly, the scope of various aspects of the present invention should not be limited by characteristics of a particular type of unique computer network address for the mobile telephone or any particular manner of determining such a network address.

Step 230 may also, for example, comprise establishing the mobile telephone as an autonomous addressable networked device by providing that the presence of the mobile telephone on the computer communication network is detectable by at least a portion of other devices coupled to the computer communication network. For example and without limitation, other devices that are also communicatively coupled to the computer communication network (e.g., other mobile telephones or mobile handhelds) may be able to scan the computer communication network or communicate with a network database to determine whether the mobile telephone is present on (e.g., communicatively coupled to) the computer communication network. In a non-limiting exemplary scenario, step 230 may comprise registering the mobile telephone with a database of devices (e.g., devices with mobile phone capability) that are presently communicatively coupled to the computer communication network. In another non-limiting exemplary scenario, step 230 may comprise providing the capability to respond to network inquiries (e.g., polling messages) sent out on the computer communication network to determine which devices are presently communicatively coupled to the network.

In a non-limiting exemplary scenario, a first autonomously networked mobile telephone may be able to determine if a second mobile telephone is communicatively coupled to the computer communication network (e.g., directly or through one or more intervening computer and/or communication networks). As a non-limiting example, a networked device desiring to communicate with the mobile telephone may determine whether the mobile telephone is presently a part of the computer communication network.

Similarly, step 230 may comprise providing the capability for the mobile telephone to detect other devices coupled to the computer communication network. For example, in a non-limiting exemplary scenario, step 230 may comprise providing the capability to determine if another mobile telephone is communicatively coupled to the computer communication network (e.g., directly or through one or more intervening computer and/or communication networks). Step 230 may, for example, comprise making such a determination by attempting to communicate with a particular mobile telephone or may communicate with a networked database comprising information of networked devices. Such a database may, for example, comprise characteristics of a database listing mobile telephones that are presently communicatively coupled to the computer communication network.

In general, step 230 may comprise communicating with the computer communication network to establish the mobile telephone (or mobile handheld multi-media gateway and phone) on the computer communication network as an autonomous addressable device. Accordingly, the scope of various aspects of the present invention should not be limited by characteristics of any particular manner of establishing a mobile device as an autonomous networked device.

The exemplary method 200 may, at step 240, comprise communicating data with at least a second networked device over the computer communication network utilizing the unique computer network address. Step 240 may, for example and without limitation, share various functional characteristics with the communication module 130 and the second communication interface module 120 of the exemplary mobile telephone 100 illustrated in FIG. 1 and discussed previously.

Such a second networked device may comprise characteristics of any of a variety of devices that may be communicatively coupled to a computer communication network (e.g., a multi-media server, a program server, another mobile telephone, a personal computer, a portable telephone coupled to the computer communication network through the PSTN, a web server, etc.).

Step 240 may, for example, comprise communicating (i.e., receiving and/or transmitting) any of a variety of types of information. For example and without limitation, step 240 may comprise communicating audio and/or video information. Also for example, step 240 may comprise communicating unsolicited message information. For example, step 240 may comprise receiving unsolicited message information and presenting such message information to a user of the mobile telephone. As a non-limiting example, step 240 may comprise providing messenger capability.

Step 240 may, for example, comprise communicating information that might be utilized for sharing stored information, accessing storage space and/or sharing processing power between networked devices. For example and without limitation, step 240 may comprise communicating file structure information with another networked device. Such file structure information may, for example, be utilized by the mobile telephone to access stored information or storage space in another networked device or vice versa. Also for example, step 240 may comprise communicating file format information with another networked device. Such file format information may, for example, be utilized by the mobile telephone (or other networked device) to access file information or convert file information to a particular format.

Additionally for example step 240 may comprise communicating processor-sharing information with another networked device. Such processor sharing information may, for example, be utilized by the mobile phone (or other networked device) to share processing power with another networked device. For example, such processor sharing information may comprise a request or command for another processor to perform an operation (e.g., file formatting, encoding/decoding, general data processing, etc.).

Step 240 may further, for example, comprise providing a user interface between the mobile telephone and a user of the mobile telephone. For example and without limitation, step 240 may comprise providing any of a variety of audio, video and/or tactile interfaces to a user. Step 240 may, for example, comprise providing video output on a display and/or audio output from a speaker. Step 240 may, for example, comprise providing for video input with a camera and/or audio input from a microphone. Also, step 240 may comprise providing for tactile input with a touchscreen, touchpad or keypad. Additionally, step 240 may comprise providing for tactile output with a vibrator.

Step 240 may, for example, comprise providing a communication interface between a user of the mobile telephone and other devices coupled to the computer communication network. For example, step 240 may comprise notifying a user of an incoming message to the mobile telephone from another communication device (e.g., another mobile telephone). Also for example, step 240 may comprise providing a user interface for information communicated over the computer communication network, where the user interface shares various characteristics with a typical mobile telephone user interface.

For example, step 240 may, for communications between the mobile telephone and another mobile telephone over a computer communication network, comprise providing a user interface that is generally the same as the user interface for a mobile telephone communication over a mobile telephone communication network. Also for example, step 240 may comprise providing user interface functionality commensurate with instant messaging.

In general, step 240 may comprise communicating information with at least a second networked device. Accordingly, the scope of various aspects of the present invention should not be limited by characteristics of any particular type of communication, any particular type of information or any particular manner of acquiring, processing or presenting communicated information.

The exemplary method 200 illustrated in FIG. 2 was presented to illustrate a portion of generally broader aspects of the present invention. Accordingly, the scope of various aspects of the present invention should not be limited by characteristics of the exemplary illustration.

Figure 3:
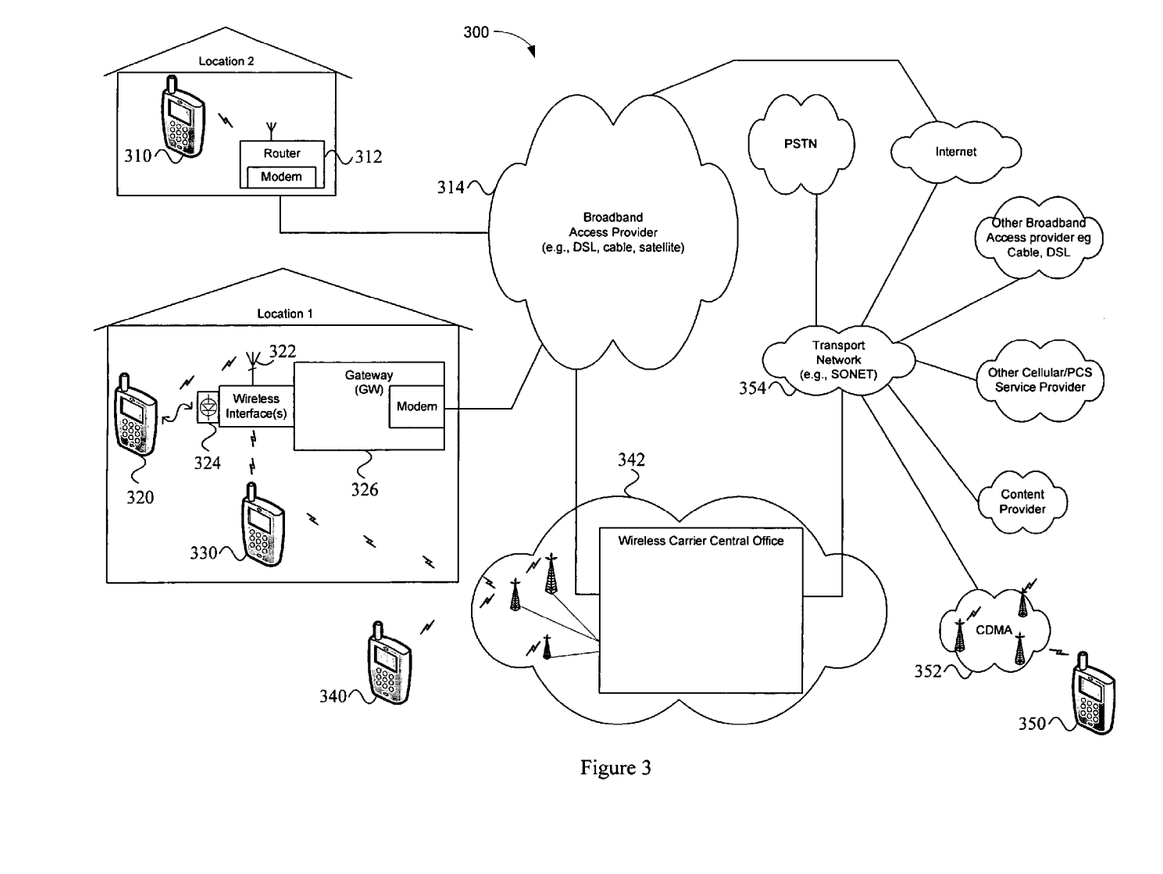
FIG. 3 is a block diagram illustrating an exemplary communication network comprising a plurality of mobile handheld multi-media gateway and phones, in accordance with various aspects of the present invention.

FIG. 3 is a block diagram illustrating an exemplary communication environment 300 comprising a plurality of mobile handheld multi-media gateway and phones, in accordance with various aspects of the present invention. The exemplary communication environment 300 may, for example and without limitation, comprise one or more mobile handheld devices, for example comprising characteristics of the exemplary mobile telephone 100 illustrated in FIG. 1 and discussed previously. The exemplary communication environment 300 may, for example and without limitation, comprise one or more mobile handheld devices (e.g., mobile telephones) performing the functionality of the exemplary method 200 illustrated in FIG. 2 and discussed previously.

The exemplary communication environment 300 may, for example, comprise one or more computer communication networks. The exemplary communication environment 300 may also, for example, comprise one or more network controllers that control registration and/or data traffic for various networked devices. The exemplary communication environment 300 may additionally, for example, comprise one or more devices that a mobile handheld multi-media gateway and phone (e.g., a non-limiting example of which was shown as the mobile telephone 100 in FIG. 1 and discussed previously) may interface with to establish an autonomous network presence.

The exemplary communication environment 300 may, for example, comprise a Broadband communication network 314 (e.g., associated with a broadband access provider). Access to such a broadband communication network 314 may, for example, be provided over DSL, cable or satellite communication links. The exemplary communication environment 300 may also, for example, comprise a wireless communication network 342. Such a wireless communication network 342 may comprise a central office and a plurality of geographically dispersed base stations. The exemplary communication environment 300 may also comprise a transport network 354 (e.g., SONET) that communicatively couples a plurality of other communication networks. Such other communication networks may, for example, comprise a CDMA communication network 352, the Internet, the PSTN, and networks associated with any of a large variety of network access providers, communication service providers, content providers, etc.

The exemplary communication environment 300 may, for example at a first location, comprise a gateway 326 comprising a plurality of wireless interfaces (e.g., an RF wireless interface 322 and a non-tethered optical interface 324). The gateway 326 may be communicatively coupled through a modem to the broadband access provider 314. The exemplary communication environment 300 may also, for example at a second location, comprise a router 312 that is communicatively coupled through a modem to a broadband access provider 314.

The exemplary communication environment 300 may further, for example, comprise a plurality of networked devices (e.g., a first networked device 310, second networked device 320, third networked device 330, fourth networked device 340 and fifth networked device 350). The networked devices may, for example and without limitation, share various characteristics with the exemplary mobile telephone 100 illustrated in FIG. 1 and discussed previously, and may also, for example, share various functional characteristics with the exemplary method 200 illustrated in FIG. 2 and discussed previously.

It should be noted that the exemplary communication environment 300 is provided to provide relatively narrow examples of generally broader aspects of the present invention. Accordingly, the scope of various aspects of the present invention should not be limited by characteristics of the exemplary communication environment 300.

The first networked device 310 may be present on a computer communication network as an autonomous addressable device. The first networked device 310 is illustrated as a mobile handheld (e.g., comprising characteristics of the exemplary mobile telephone 100 discussed previously), but may comprise characteristics of any of a variety of networked devices.

The computer communication network may also comprise a communication port (e.g., RF communication port 322 and/or non-tethered optical communication port 324) through which a mobile device (e.g., the second networked device 320) may communicate with the first networked device 310 over the computer communication network. The communication port may, for example and without limitation, comprise characteristics of a wireless LAN communication port or a wireless PAN communication port.

The second networked device 320 (e.g., a mobile handheld multi-media gateway and phone) may, for example, be coupled to the computer communication network (e.g., the Internet or a LAN at Location 1) through the RF communication port 322 and/or the non-tethered optical communication port 324. The second networked device 320 may be present on the computer communication network as an autonomous addressable device. The second networked device 320 may, for example, be established as an autonomous addressable device on the computer communication network in a manner such as those discussed previously with regard to FIGS. 1 and 2. For example, the second networked device 320 may have an IP address exclusively assigned to it. Also for example, the second networked device 320 may have a unique computer LAN address assigned to it.

In a first non-limiting exemplary scenario, the first networked device 310 may be communicatively coupled to the Internet through a PAN at location 2, a router 312 at location 2, and the broadband access provider 314. The first networked device 310 (which may comprise a mobile handheld telephone) may, for example, comprise a unique IP address for Internet communications.

Continuing the first non-limiting exemplary scenario, the second networked device 320 may be communicatively coupled to the Internet through an RF communication port 322, LAN and gateway 326 at location 1, the broadband access provider 314, the wireless carrier network 342, and the transport network 354. The second networked device 320 (which may comprise a mobile handheld telephone) may, for example, comprise a unique IP address for Internet communications.

Both the first networked device 310 and the second networked device 320 may, for example, have a presence on the Internet that is detectable by the other device. As discussed previously, such a presence may be detectable by a database inquiry, polling technique or a combination thereof. Such a database may, for example be centrally located on the computer communication network or geographically distributed (e.g., with components at the Broadband Access Provider, Location 1 LAN, wireless carrier central office, Internet hubs, etc.). Each of the first networked device 310 and the second networked device 320 may also be capable of detecting the presence of the other device on the Internet.

In a second non-limiting exemplary scenario, the third networked device 330 may comprise the capability to interface with the wireless carrier network 342 directly. The third networked device 330 may, for example, share various characteristics with the exemplary mobile telephone 100 illustrated in FIG. 1 and discussed previously. The third networked device 330 may attempt to communicate with the second networked device 320 through the wireless carrier network 342 in a standard telecommunication manner. If the third networked device 330 fails to communicate with the second networked device 320 through the wireless carrier network 342 in a standard telecommunication manner, the third networked device 330 may then attempt to establish communication with the second networked device 320 through a computer communication network (e.g., the Internet).

The third networked device 330 may, for example, communicate with the Internet (e.g., through the wireless carrier network 342 and transport network 354; or through the Location 1 LAN and gateway 326 and broadband access provider 314, and communicate with the second networked device 320 through the Internet. Both the second networked device 320 and the third networked device 330 may comprise unique respective IP addresses for such Internet communication.

In a third non-limiting exemplary scenario, instead of communicating with the second networked device 320 over the Internet, the third networked device 330 may attempt to communicate with the second networked device 320 over the Location 1 LAN. For example, the second networked device 320 may have been established on the Location 1 LAN as an autonomous addressable device (e.g., with an IP address or LAN address). The third networked device 330 may communicate with the Location 1 LAN to be established as an autonomous addressable device on the Location 1 LAN. The third networked device 330 and the second networked device 320 may then communication through the Location 1 LAN.

In a fourth non-limiting exemplary scenario, the fourth networked device 340 (e.g., comprising characteristics of the mobile telephone 100 discussed previously with regard to FIG. 1) may communicate through the wireless carrier central office 342 and transport network 354 to an Internet access point and establish a presence on the Internet as an autonomous addressable device. The fourth networked device 340, so established, may establish Internet communications (e.g., through a firewall) with the Location 1 LAN and determine (e.g., through database inquiry) that the second networked device 320 is established on the Location 1 LAN as an autonomous addressable device with an independent network presence. The fourth networked device 340 may then, for example, establish direct communications with the second networked device 320 as an autonomous addressable device.

In a fifth non-limiting exemplary scenario, the fifth networked device 350 (e.g., comprising characteristics of the mobile telephone 100 discussed previously with regard to FIG. 1) may communicate with an Internet access point through the CDMA network 352 and transport network 354 and establish an independent presence on the Internet as an autonomous addressable device having a unique IP address. The fifth networked device 350 may communicate directly with an Internet web site to acquire software or other data (e.g., audio, video or multi-media information) directly from the Internet web site. Such software or other data may then be addressed to the fifth networked device 350 as an autonomous addressable device on the Internet (e.g., as opposed to a peripheral or attachment of some other networked device) using the unique IP address of the fifth networked device 350.

The exemplary communication network 300 illustrated in FIG. 3 and the exemplary scenarios were presented to illustrate a portion of generally broader aspects of the present invention. Accordingly, the scope of various aspects of the present invention should not be limited by characteristics of the exemplary illustration.

Figure 4:
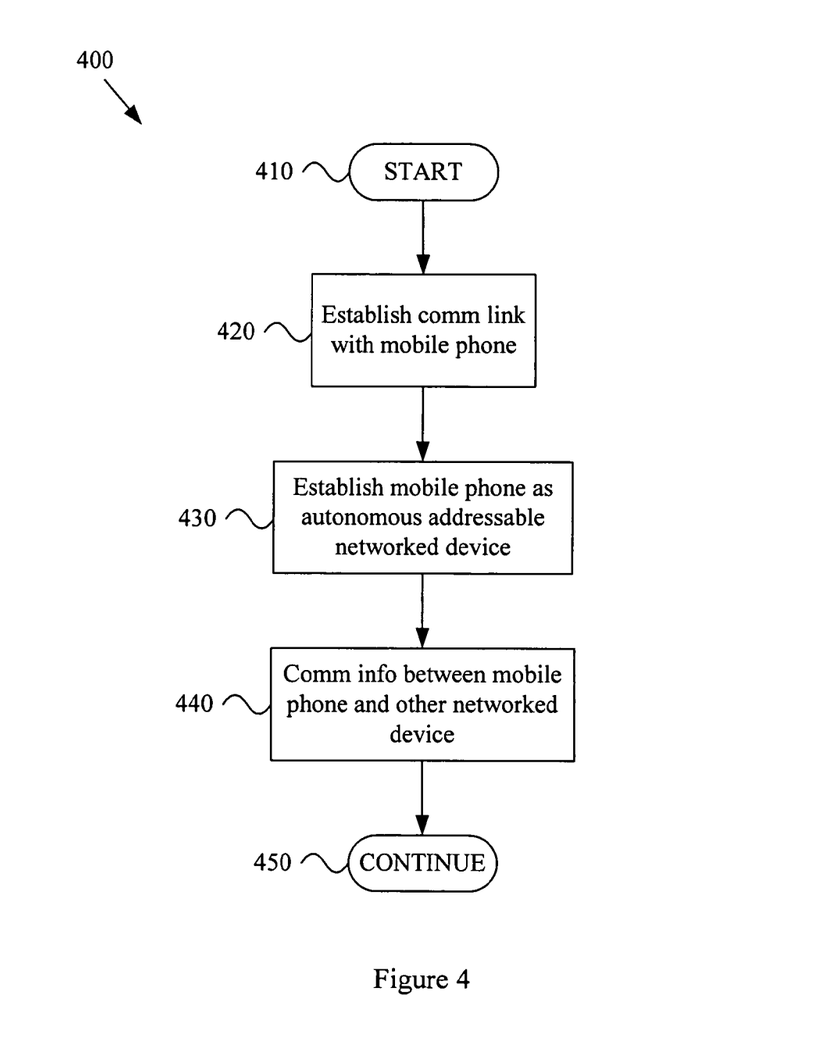
FIG. 4 is a flow diagram illustrating an exemplary method for utilizing a mobile handheld multi-media gateway and phone in a computer network, in accordance with various aspects of the present invention.

FIG. 4 is a flow diagram illustrating an exemplary method 400 for utilizing a mobile handheld multi-media gateway and phone in a computer network, in accordance with various aspects of the present invention. The exemplary method 400 may, for example and without limitation, share various characteristics with functionality discussed previously with regard to the exemplary systems 100, 300 and method 200 illustrated in FIGS. 1-3 and discussed previously. The mobile handheld multi-media gateway and phone may, for example and without limitation, share various characteristics with the exemplary mobile telephone 100 illustrated in FIG. 1 and discussed previously. The mobile handheld multi-media gateway and phone may be referred to in the following discussion as the "mobile telephone."

For example, the exemplary method 400 may, at step 420, comprise establishing a communication link with a mobile handheld multi-media gateway and phone (e.g., a mobile telephone 100 as discussed previously with regard to FIG. 1). Step 420 may comprise establishing such a communication link in any of a variety of manners. Step 420 may, for example and without limitation, comprise various functional characteristics corresponding to step 220 of the exemplary method 200 illustrated in FIG. 2 and/or the second communication interface module 120 of the exemplary mobile telephone 100 illustrated in FIG. 1 and discussed previously, albeit from the perspective of the computer network rather than the mobile telephone.

For example, step 420 may comprise establishing a communication link with the mobile telephone over any of a variety of communication media or utilizing any of a variety of protocols. Step 420 may comprise establishing a communication link with the mobile telephone over any of a variety of communication pathways. Such pathways may, for example and without limitation, comprise at least one of, or any combination of, the Internet, a MAN, a WAN, a LAN, a PAN, etc. Such pathways may also comprise other communication networks (e.g., cellular phone, PSTN, television cable, satellite communication networks, etc.) communicatively coupled to computer network(s).

Step 420 may comprise establishing a communication link through any of a variety of computer network devices. Such computer network devices may, for example and without limitation, comprise personal computers, dedicated computer network access points, network servers, etc. In general, step 420 may comprise establishing a communication link with a mobile handheld gateway and phone in any of a variety of manners. Accordingly, the scope of various aspects of the present invention should not be limited by characteristics of any particular manner of establishing a communication link.

The exemplary method 400 may, at step 430, comprise communicating with the mobile telephone to establish the mobile telephone on the computer communication network as an autonomous addressable device (e.g., having an independent network presence) comprising a unique computer network address. Step 430 may, for example and without limitation, comprise various functional characteristics corresponding to step 230 of the exemplary method 200 illustrated in FIG. 2 and/or the communication module 130 of the exemplary system 100 illustrated in FIG. 1 and discussed previously, albeit from the perspective of the computer network rather than the mobile telephone.

For example and without limitation, step 430 may comprise establishing the mobile telephone on the computer communication network as an autonomous addressable device may comprise determining and/or establishing an IP address, LAN address, or other computer communication network address that uniquely identifies the mobile telephone as an autonomous networked device on the computer network. Also for example, step 430 may comprise establishing the mobile telephone on the computer communication network by registering information of the mobile telephone in a database of networked devices. In a non-limiting exemplary scenario, such a database may comprise a unique computer communication network address corresponding to the mobile telephone along with other identifying information (e.g., a telephone number and/or serial number, user identification information, etc.).

Step 430 may also, as discussed previously with regard to FIGS. 1-3, comprise establishing the mobile telephone as a detectable device on the computer communication network (e.g., by providing registration and/or inquiry functionality). Further for example, step 430 may comprise providing functionality to the mobile telephone enabling the mobile telephone to detect other devices that are communicatively coupled to the computer communication network (e.g., other mobile handheld multi-media gateway and phone devices).

In general, step 430 may comprise establishing the mobile handheld gateway and phone on the computer communication network as an autonomous addressable device. Accordingly, the scope of various aspects of the present invention should not be limited by characteristics of any particular manner of establishing a device on a computer communication network as an autonomous addressable device.

The exemplary method 400 may, at step 440, comprise communicating information between a first networked device and the mobile telephone through the computer communication network (e.g., utilizing the computer network address of the mobile telephone). Step 440 may, for example and without limitation, comprise various functional characteristics corresponding to step 240 of the exemplary method 200 illustrated in FIG. 2 and/or the communication module 130 and second communication interface module 120 of the exemplary mobile telephone 100 illustrated in FIG. 1 and discussed previously, albeit from the perspective of the computer communication network rather than the mobile telephone.

Step 440 may, for example, comprise communicating information between the first networked device and the mobile telephone utilizing the communication link established at step 420. Step 440 may also, for example, comprise communicating information to and/or from the mobile telephone utilizing a unique computer communication network address for the mobile handheld gateway and phone (e.g., as may have been established at step 430). The first networked device may comprise characteristics of any of a variety of networked devices. For example and without limitation, the first networked device may comprise characteristics of a mobile handheld multi-media gateway and phone, as discussed previously. The first networked device may also, for example, comprise characteristics of a mobile telephone, personal computing device, media information server, web server, software server, etc.

The exemplary method 400 illustrated in FIG. 4 was presented to illustrate a portion of generally broader aspects of the present invention. Accordingly, the scope of various aspects of the present invention should not be limited by characteristics of the exemplary method 400.

Figure 5:
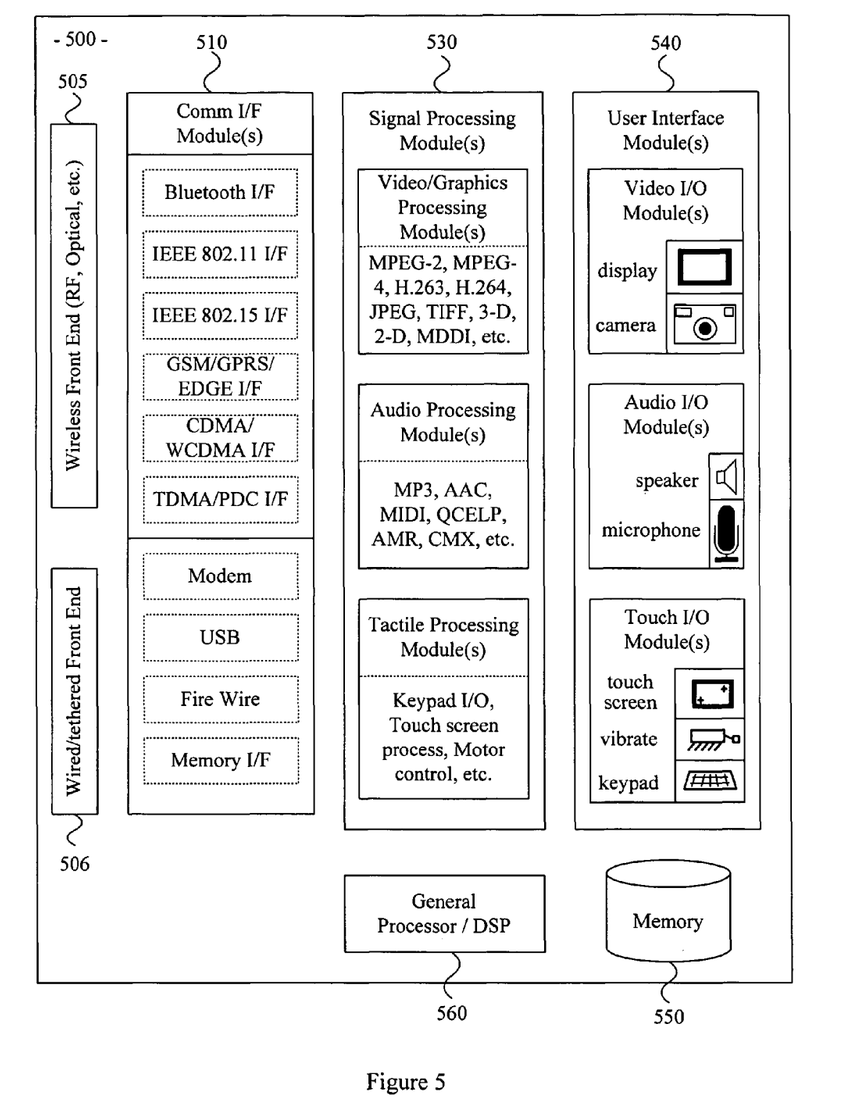
FIG. 5 is a block diagram illustrating an exemplary mobile handheld multi-media gateway and phone, in accordance with various aspects of the present invention.

FIG. 5 is a block diagram illustrating an exemplary mobile handheld multi-media gateway and phone 500, in accordance with various aspects of the present invention. The exemplary mobile hand-held multi-media gateway and phone 500 (which may be referred to below in a non-limiting manner as the "mobile telephone 500") may, for example and without limitation, share various characteristics with the exemplary mobile hand-held multi-media gateway and phone 100 illustrated in FIG. 1 and discussed previously.

For example, the mobile telephone 500 may comprise any of a variety of communication interface modules 510, a wireless front end 505 and a wired/tethered front end 506, which may, for example and without limitation, share various characteristics with the exemplary first and second communication interface modules 110, 120 of the exemplary mobile telephone 100 illustrated in FIG. 1 and discussed previously. Also for example, the mobile telephone 500 may comprise a processor 560 and memory 550, which may, for example and without limitation, share various characteristics with the processor 160 and application memory 150 of the exemplary mobile telephone 100 illustrated in FIG. 1 and discussed previously.

Further for example, the mobile telephone 500 may comprise any of a variety of user interface modules 540, which may, for example and without limitation, share various characteristics with the user interface module 140 of the exemplary mobile telephone 100 illustrated in FIG. 1 and discussed previously. Still further for example, the mobile telephone 500 may comprise any of a variety of signal processing modules 530, which may, for example and without limitation, share various characteristics with the communication module 130 and/or portions of the first and/or second communication interface modules 110, 120 of the exemplary mobile telephone 100 illustrated in FIG. 1 and discussed previously.

The exemplary mobile telephone 500 illustrated in FIG. 5 was presented to illustrate a portion of generally broader aspects of the present invention. Accordingly, the scope of various aspects of the present invention should not be limited by characteristics of the exemplary illustration.

In summary, various aspects of the present invention provide a system and method for providing a mobile handheld multi-media gateway and phone. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
by a networked communication device in data communication with a first data network, establishing a wireless communication link with a mobile communication device, the mobile communication device configured for cellular telephone communication with a cellular telephone network operated by a cellular service provider;
receiving from the mobile communication device, over the wireless communication link, identification information uniquely identifying the mobile communication device, including at least one of a mobile telephone number of the mobile communication device and an electronic serial number of the mobile communication device;
providing over the wireless communication link, by the networked communication device to the mobile communication device, an internet protocol (IP) address uniquely identifying the mobile communication device on the first data network for communications on the first data network, the IP address being established using the identification information received from the mobile communication device;
the IP address useable by the mobile communication device when communicating data between the mobile communication device and at least one other device on the first data network using the IP address, including downloading data from the cellular service provider to the mobile communication device over the first data network using the IP address.

2. The method of claim 1 further comprising:
by the networked communication device,
receiving over the wireless communication network, from the mobile communication device, data defining a command to control operation of the at least one other device on the first data network; and
communicating over the first data network the received data defining the command to the at least one other device.

3. The method of claim 1 further comprising:
by the networked communication device,
receiving over the wireless communication network, from the mobile communication device, data to share processing power of a processor of the mobile communication device with a processor of the at least one other device on the first data network.

4. The method of claim 1 further comprising:
by the networked communication device,
receiving over the wireless communication network, from the mobile communication device, data to access stored information stored at the at least one other device over the first data network.

5. The method of claim 1 further comprising:
by the networked communication device,
communicating data with a remote broadband network;
receiving from the remote broadband network data intended for the mobile communication device;
communicating data between the mobile communication device and the remote broadband network using the IP address.

6. The method of claim 5 wherein the networked communication device comprises a gateway in data communication with the remote broadband network, the method further comprising:
by the gateway,
establishing a wireless local area network as the first data network, and
communicating data between the remote broadband network and the mobile communication device over the wireless local area network using the IP address on the wireless local area network assigned to the mobile communication device.

7. The method of claim 1 further comprising, by the networked communication device, determining the IP address for the mobile communication device based, at least in part on the mobile telephone number of the mobile communication device or the electronic serial number of the mobile communication device.

8. The method of claim 1 wherein downloading data from the cellular service provider comprises downloading software updates for the mobile telephone from the cellular service provider to the mobile telephone over the first data network using the IP address.

9. The method of claim 1 wherein downloading data from the cellular service provider comprises downloading multimedia information to the mobile telephone from the cellular service provider to the mobile telephone over the first data network using the IP address.

10. A method comprising:
by a networked communication device in data communication with a first data network, establishing a wireless communication link with a mobile communication device, the mobile communication device comprising a mobile telephone configured for cellular telephone communication with a cellular telephone network operated by a cellular service provider;

receiving from the mobile communication device, over the wireless communication link, identification information uniquely identifying the mobile communication device, including at least one of a mobile telephone number of the mobile communication device and an electronic serial number of the mobile communication device;

providing over the wireless communication link, by the networked communication device to the mobile communication device, an internet protocol (IP) address uniquely identifying the mobile communication device on the first data network for communications on the first data network, the IP address being established using the identification information received from the mobile communication device, wherein the IP address is useable by the mobile communication device when communicating data between the mobile communication device and at least one other device on the first data network using the IP address; and wherein communicating data between the mobile communication device and at least one other device on the first data network using the IP address comprises:

initiating communication between the mobile communication device over the first data network using the IP address and a remote broadband network to continue a call in progress on the cellular telephone network when the call in progress has been inadvertently dropped between the cellular telephone network and the mobile telephone.

11. A system comprising:

a wireless interface configured to establish a wireless local area network with one or more mobile communication devices in an area;

a gateway configured for data communication with the wireless interface, the gateway further configured to determine an internet protocol (IP) address uniquely identifying a selected mobile communication device on the wireless local area network for data communication on the wireless local area network, the gateway establishing the IP address using the identification information received from the selected mobile communication device; and a modem configured for data communication with the gateway and a remote broadband network, including receiving from the remote broadband network data intended for the selected mobile communication device using the IP address for the selected mobile communication device on the wireless local area network, the modem being configured to receive software update data for the selected mobile communication device and to communicate the software update data to the gateway for communication to the selected mobile communication device using the IP address.

12. The system of claim 11 wherein the gateway is configured to receive a mobile telephone number of the mobile communication device or an electronic serial number of the selected mobile communication device, or both, and wherein the gateway is further configured to determine the IP address for the selected mobile communication device using one of the mobile telephone number and the electronic serial number.

13. The system of claim 11 wherein the one or more mobile communication devices comprises a plurality of communication devices and wherein the wireless interface is configured to communicate data between the selected mobile communication device and a second mobile communication device of the plurality of mobile communication devices on the wireless local area network in the area using the IP address for the selected mobile communication device on the wireless local area network.

14. The system of claim 13 wherein the wireless interface is configured to receive over the wireless local area network, from the selected mobile communication device, user interface data defining a command to control operation of second mobile communication device on the wireless local area network, and to communicate over the wireless local area network the received user interface data defining to command to the second wireless communication device to enable control of operation of the second wireless communication device by the selected mobile communication device.

15. In a computer communication network, a method for providing communication with a mobile telephone, the method comprising:

by a network device in data communication with the computer communication network, establishing a communication link between the network device and the mobile telephone;

by the network device, communicating with the mobile telephone to receive from the mobile telephone over the communication link identification information uniquely identifying the mobile telephone, the identification information including at least one of a mobile telephone number of the mobile telephone and an electronic serial number of the mobile telephone;

by the network device, providing over the communication link to the mobile telephone an internet protocol (IP) address which uniquely identifies the mobile telephone on a local computer network for data communication on the local computer network, the IP address being established using the identification information received from the mobile telephone, the IP address provided by the network device being useable by the mobile telephone for communicating information between a first networked device and the mobile telephone through the local computer network utilizing the IP address of the mobile telephone;

by the network device, receiving from a remote broadband network software update data intended for the mobile telephone; and by the network device, communicating software update data from the remote broadband network the mobile telephone using the IP address.

16. The method of claim 15 wherein establishing a communication link with the mobile telephone comprises, by the network device, establishing the communication link with the mobile telephone through a dedicated wireless access point of the local computer network.

* * * * *